US010771187B1

(12) United States Patent
Gamage et al.

(10) Patent No.: US 10,771,187 B1
(45) Date of Patent: Sep. 8, 2020

(54) ADAPTIVE CODING FOR WIRELESS COMMUNICATION

(71) Applicants: Arm Limited, Cambridge (GB); ECS Partners Limited, Southampton (GB)

(72) Inventors: Sahan Sajeewa Hiniduma Udugama Gamage, Cambridge (GB); Benjamin James Fletcher, Burwell (GB); Shidhartha Das, Upper Cambourne (GB)

(73) Assignees: Arm Limited, Cambridge (GB); ECS Partners Limited, Southampton (GB)

(*) Notice: Subject to any disclaimer, the term of this patent is extended or adjusted under 35 U.S.C. 154(b) by 0 days.

(21) Appl. No.: 16/656,937

(22) Filed: Oct. 18, 2019

(51) Int. Cl.
*H04L 1/00* (2006.01)
*H04L 7/00* (2006.01)
*H04B 5/00* (2006.01)

(52) U.S. Cl.
CPC ......... *H04L 1/0014* (2013.01); *H04B 5/0075* (2013.01); *H04L 7/0091* (2013.01)

(58) Field of Classification Search
CPC .... H04L 1/0014; H04L 7/0091; H04B 5/0075
USPC ....................................................... 375/328
See application file for complete search history.

(56) References Cited

U.S. PATENT DOCUMENTS

| 6,956,510 | B1* | 10/2005 | He | H03M 5/145 |
| | | | | 341/56 |
| 2017/0288741 | A1* | 10/2017 | Zhu | H04B 5/02 |
| 2019/0074914 | A1* | 3/2019 | Hueber | H04B 5/0075 |

OTHER PUBLICATIONS

I.A. Papistas and V.F. Pavlidis, "Efficient Modeling of Crosstalk Noise on Power Distribution Networks for Contactless 3-D ICs," in IEEE Transactions on Circuits and Systems I: Regular Papers, vol. 65, No. 8, pp. 2547-2558, Aug. 2018.
Jian Xu, J. Wilson, S. Mick, Lei Luo and P. Franzon, "2.8 Gb/s inductively coupled interconnect for 3D ICs," Digest of Technical Papers. 2005 Symposium on VLSI Circuits, 2005., Kyoto, Japan, 2005, pp. 352-355.
K. Ueyoshi et al., "QUEST: A 7.49TOPS multi-purpose log-quantized DNN inference engine stacked on 96MB 3D SRAM using inductive-coupling technology in 40nm CMOS," 2018 IEEE International Solid—State Circuits Conference—(ISSCC), San Francisco, CA, 2018, pp. 216-218.

(Continued)

*Primary Examiner* — Kevin M Burd
(74) *Attorney, Agent, or Firm* — Leveque IP Law, P.C.

(57) ABSTRACT

A method and apparatus for transferring data maps the data to a modulation code using an encoder circuit having a configuration. A binary symbol of the data is mapped to a modulation code having a plurality of modulation digits and a modulation signal is generated based on the modulation code. A transmitter drive signal is modulated based on the modulation signal. A configuration of the encoder circuit is set based on a determined performance level. The transmitter drive signal may be used to produce an electromagnetic field by generating a positive, negative or zero electrical current in an induction coil of a first semiconductor die. A current induced by the electromagnetic field in an induction coil of a second semiconductor die is demodulated to recover the data whereby the data is transferred from the first semiconductor die to the second semiconductor die.

20 Claims, 13 Drawing Sheets

(56) References Cited

OTHER PUBLICATIONS

M. Saito, N. Miura and T. Kuroda, "A 2Gb/s 1.8pJ/b/chip inductive-coupling through-chip bus for 128-Die NAND-Flash memory stacking," 2010 IEEE International Solid-State Circuits Conference—(ISSCC), San Francisco, CA, 2010, pp. 440-441.

N. Miura, D. Mizoguchi, M. Inoue, T. Sakurai and T. Kuroda, "A 195-gb/s 1.2-W inductive inter-chip wireless superconnect with transmit power control scheme for 3-D-stacked system in a package," in IEEE Journal of Solid-State Circuits, vol. 41, No. 1, pp. 23-34, Jan. 2006.

S. Han and D. D. Wentzloff, "Wireless power transfer using resonant inductive coupling for 3D integrated ICs," 2010 IEEE International 3D Systems Integration Conference (3DIC), Munich, 2010, pp. 1-5.

T. Zhang et al., "A 3D SoC design for H.264 application with on-chip DRAM stacking," 2010 IEEE International 3D Systems Integration Conference (3DIC), Munich, 2010, pp. 1-6.

X. Liao, J. Zhou and X. Liu, "Exploring AMBA AXI on-Chip interconnection for TSV-based 3D SoCs," 2011 IEEE International 3D Systems Integration Conference (3DIC), 2011 IEEE International, Osaka, 2012, pp. 1-4.

M. Matsuo, T. Ohtsuki and I. Sasase, "Rate-adaptive indoor infrared wireless communication systems using punctured convolutional codes and adaptive PPM," Ninth IEEE International Symposium on Personal, Indoor and Mobile Radio communications (Cat. No. 98TH8361), Boston, MA, USA, 1998, pp. 693-697.

N. J. August, R. Thirugnanam and Dong Sam Ha, "An adaptive UWB modulation scheme for optimization of energy, BER, and data rate," 2004 International Workshop on Ultra Wideband Systems Joint with Conference on Ultra Wideband Systems and Technologies. Joint UWBST & IWUWBS 2004 (IEEE Cat No. 04EX812), Kyoto, Japan, 2004, pp. 182-186.

S. S. Ameer Abbas, P. Vishnoo Priyaa and A. Vinitha, "A Novel Approach for Better Throughput in Near Field Communication Built by Ternary QAM using Tanner Tool," 2019 International Conference on Communication and Signal Processing (ICCSP), Chennai, India, 2019, pp. 0572-0576.

* cited by examiner

ADAPTIVE CODING FOR WIRELESS COMMUNICATION

BACKGROUND

The present disclosure relates to wireless communication and, in particular to coding mechanisms for wireless communication.

Wireless communication is used in many applications. In wireless communication, a signal is propagated via near-field or far-field radio or via an optical communication channel, for example. Inductive coupling data transceivers are increasingly used for providing wireless communication over short distances and have been adopted, for example, in RFID (radio-frequency identification), contactless payment and bio-implanted devices. Inductive coupling data transceivers have also been proposed for chip-to-chip communication.

Prior implementations of inductive data transceivers use fixed coding schemes, where one data bit (binary-digit) is mapped to one-or-more transmission (TX) current pulses. A disadvantage of this approach is that it can consume excessive power or energy.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
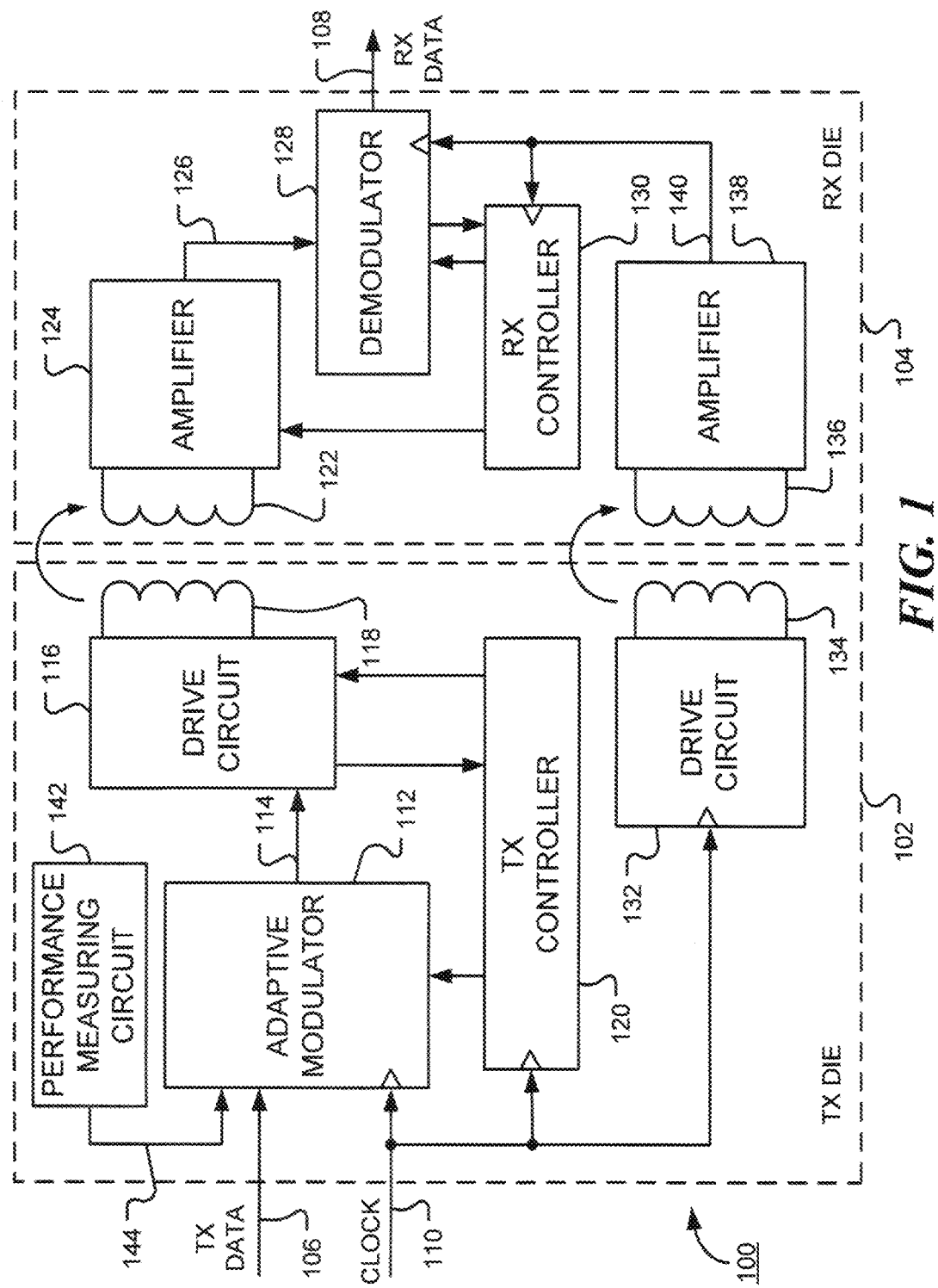
FIG. 1 is a block diagram of a wireless communication system, in accordance with various representative embodiments.

The present disclosure provides methods and apparatus for wireless communication. Classes of modulation schemes are described that enable selection a modulation scheme that provides improved performance in the presence of operational constraints.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

Embodiments of the present disclosure enable a wireless communication system, such as an inductively coupled chip-to-chip link for example, to operate at a near optimal bit-rate within the energy or power capabilities of the system. Modulation schemes described below provide a sufficient granularity of operating points to enable a near-optimal scheme to be selected. The near-optimal modulation scheme may be selected dynamically based on a determined performance level. The configuration of an encoder circuit is set to implement the selected modulation scheme.

Inductively coupled near-field channels have been demonstrated to provide high-bandwidth wireless communication over short distances in a variety of applications—including contactless memory card interfaces, bio-implanted devices, RFID cards and chip-to-chip data communication (e.g. in a three-dimensional (3D) stacked integrated circuit (IC) or a 3D System-in-Package (SiP).

In an inductive communication channel, data is encoded as a series of current pulses that pass through a transmitting (TX) inductor to generate an electromagnetic field. The electromagnetic field is intersected by a receiving (RX) inductor and induces a current in the RX inductor that can be used to recover the original sequence of current pulses and, hence, data stream.

One embodiment of the present disclosure includes a method for transferring data. An embodiment includes using an encoder circuit to map a binary symbol of the data to a modulation code having a number of modulation digits. A modulation signal is generated based on the modulation code and a transmitter drive signal is modulated based on the modulation signal. The configuration of the encoder circuit may be set to optimize a performance level.

The modulation code may include, for example, one or more modulation digits inside a window, where a leading digit of the one or more modulation digits inside the window has a non-zero value, together with one or more modulation digits outside of the window, where the one or more modulation digits outside of the window having a value of zero. In a further embodiment, the modulation digits include at least one modulation digit having a value of zero.

The set of modulation codes used in a particular configuration may be selected from a larger set of codes to provide optimal performance. A configuration may specify, for example, a width, in bits, of the binary symbol and a width, in digits, of the modulation code, together with a code book for mapping binary symbols to modulation codes.

The modulation digits may be ternary digits used to generate a modulation signal having a positive level, a negative level or a zero level. Alternatively, the modulation digits may be binary digits, used to generate a modulation signal having a zero level or a non-zero level.

The modulation code may be used to modulate an electrical current in a transmitting inductor to produce an electromagnetic field.

The configuration of a decoder circuit may be set based on the configuration of the encoder circuit. The data is recovered by measuring an electrical current induced in a receiving inductor to generate a received signal when the receiving inductor is located in an electromagnetic near-field of the transmitting inductor. The received signal is used to produce demodulated digits that are mapping, in the decoder circuit, to a received binary symbol.

One embodiment of the present disclosure includes a chip-carrier package containing first and second semiconductor dies. The first semiconductor die includes a modulator circuit configured to generate a modulation signal having three levels. The modulation signal is based on a modulation code. The modulation circuit includes an encoder, the configuration of which is set to generate the modulation code from a binary symbol of data to be transmitted from the first semiconductor die. The first semiconductor die also includes a transmitting induction coil and a driver circuit. The driver circuit is coupled to the modulator circuit and the transmitting induction coil and is configured to generate a positive, negative or zero electrical current in the transmitting induction coil based on the level of the modulation signal. The second semiconductor die includes a receiving induction coil, a demodulator circuit and an amplifier circuit. The amplifier circuit is coupled to the receiving induction coil and the demodulator circuit and is configured to amplify a signal induced in the receiving induction coil to generate an amplified signal when the receiving induction coil is located in a near-field of an electromagnetic field produced by the electrical current in the transmitting induction coil. The amplified signal is provided to the demodulator circuit.

FIG. 1 is a simplified block diagram of an inductively-coupled wireless communication system 100 for data transfer, in accordance with an embodiment of the present disclosure. In the embodiment shown, data is transferred between semiconductor dies. Communication system 100 includes a first semiconductor die (chip), 102, and a second semiconductor die, 104. Transmission (TX) data 106 is transferred from the first semiconductor die 102 to the second semiconductor die 104 to provide received (RX) data 108. Clock signal 110 may be used to synchronize data transfer. TX data 106 is input to adaptive modulator 112 to produce modulation signal 114. In turn, modulation signal 114 is input to drive circuit 116 that drives transmitter induction coil 118. Operation of adaptive modulator 112 and drive circuit 116 is controlled by transmission (TX) controller 120. Receiver induction coil 122 is excited by the electromagnetic field produced by transmitter induction coil 118 and the resulting electrical signal is amplified in amplifier 124. Modulated data on input 126 is demodulated in demodulator 128 to provide RX data 108. Operation of demodulator 128 and amplifier 124 is controlled by receiver (RX) controller 130.

Clock signal 110 may be communicated to second semiconductor die 104 via drive circuit 132 and clock induction coil 134. Induction coil 136 is excited by the electromagnetic field produced by clock induction coil 134 and the resulting electrical signal is amplified in amplifier 138 to provide clock signal 140. Clock signals 110 and 140 enable operation of the first and second semiconductor dies to be synchronized.

Performance measuring circuit 142 may be provided to measure a performance level, A performance level may include one or more aspects of system operation such as, for example, power or energy consumption, effective data transfer rate, data transfer latency or error rate. Performance measuring circuit 142 determines performance levels that facilitate selection of an optimal or near-optimal modulation scheme.

In one embodiment, the transferred data includes error detection and/or correction data, such as a checksum or parity for example, that enables the detection and/or correction of errors in received data by demodulator 128, In addition, a further signal path may be provided from RX die 104 back to TX die 102. This signal path, not shown in FIG. 1, may be used, for example, to acknowledge data transfers with no error or for which an error has been corrected. The signal path may be used to indicate that an error is detected. In response to an uncorrectable error, TX die 102 may resend the data. Resending data reduces the effective data transfer rate. The effective data transfer rate and/or error rate may be used in performance measuring circuit 142 to determine a performance level.

Many embodiments of the disclosure relate to the operation of adaptive modulator 112 and corresponding demodulator 128, in addition to drive circuit 116.

Prior implementations of chip-to-chip inductive data transceivers use binary pulse code modulation to map serial TX data bits (TX DATA) to one or more current pulses, ITX, in a transmission inductor coil. Example binary schemes include Non-return-to-zero (NRZ) edge or level encoding, Manchester encoding, return-to-zero edge or level encoding, bi-phase encoding, Miller encoding, and pulse interval encoding.

In all of the above-mentioned binary schemes, the power and energy requirements are, in general, the same as or slightly worse than simple on-off keying (OOK).

In transceivers using the above schemes, data is encoded on a per-cycle basis because accurate clock recovery in typical inductive coupling applications may not be guaranteed. Each of these prior implementations requires, on average, at least one ITX current pulse for every two transmitted bits. While this is acceptable for traditional applications (such as RFID, where power is being delivered from a mains-supplied tag reader, or wired communication), energy consumption and power requirements are primary concerns in some applications, such as chip-to-chip communication and communication between battery powered devices. In addition, an application may need to guarantee a minimum bit-rate or to maintain the fastest bit-rate while operating below either a power or energy threshold. In some situations, power and energy consumption may vary depending on environmental and process factors, such as electromagnetic interference sustained by a chip, for example. Existing modulation schemes do not provide sufficient flexibility to enable adaptation of the operating point.

Figure 2:
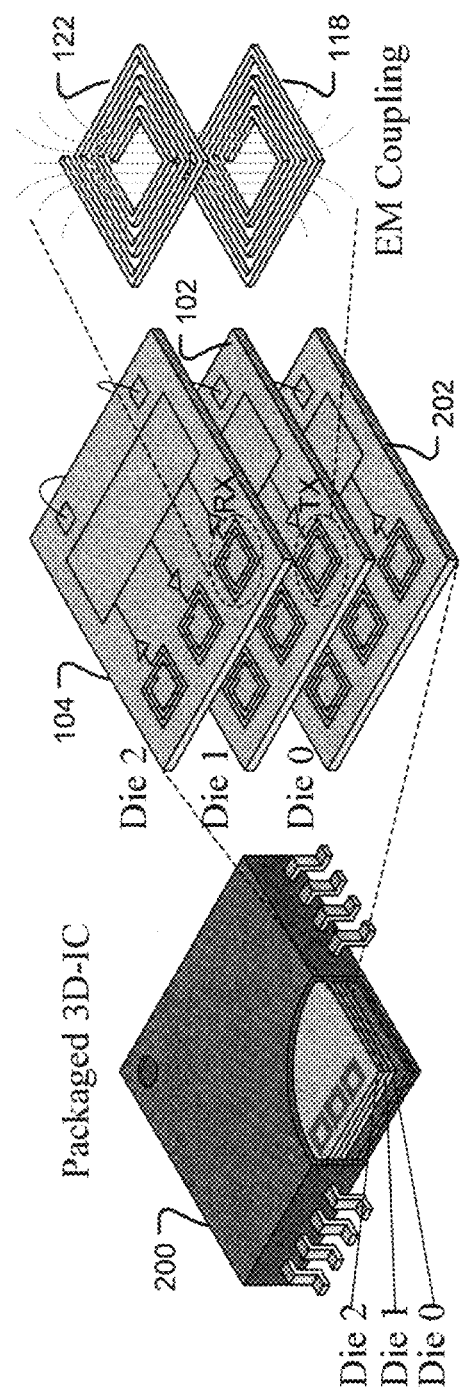
FIG. 2 is a diagrammatic representation of a wireless communication system embodied in a package of stacked semiconductor dies, in accordance with various representative embodiments.

FIG. 2 is a diagram of a package 200 containing stacked semiconductor dies in accordance with embodiments of the disclosure. In the example shown, the package contains three stacked dies, 202, 102 and 104, that are inductively coupled. Since semiconductor cost increases with area, wireless communication between inductively coupled semiconductor dies may use small inductors, such as transmitter induction coil 118 and receiver induction coil 122. Smaller inductors result in weaker channel coupling and, consequently, use more energy-per-pulse for reliable communication. The semiconductor dies are stacked in a package and do not move, so both the alignment of inductors and the communication distance are fixed between transmissions. The dies may be bonded together, for example. Consequently, transmission times are fixed.

In some embodiments, the transmitter and receiver can be reset synchronously, through chip-to-package bonding for example, to enable precise synchronization. As shown in FIG. 1 for example, clock signal 110 can be transmitted through a separate link to provide time alignment with negligible clock drift. Since the clock signal can be transmitted reliably, existing binary schemes, such as OOK can be employed, where 1 is transmitted as sending a pulse and 0 as not sending a pulse.

In a wired communication system, it may an advantage for the modulation signal to have little or no direct-current (DC) component, to enable the cable to be used for longer distances and to carry power for intermediate equipment such as line repeaters. This may be achieved by using pulses that can take a positive, negative or zero values. A scheme that transmits three values is referred to as a tristate or ternary (as opposed to binary) modulation scheme. An example is the 4B3T (four Binary, three Ternary) line encoding scheme described in the Integrated Services Digital Network (ISDN) Primary Rate Interface (PRI) standard for wired communication. This scheme encodes each block of four binary digits as three ternary digits. Some of the $2^4$ binary patterns may be encoded as one of a pair of polar-opposite ternary symbols. The polarity of the symbol is selected dynamically to minimize the accumulated DC component of the signal. Similarly, a duo-binary line encoding scheme alternatively encodes ones as a positive or negative pulse to minimize the DC value of the signal.

In general, however, wireless communication uses the presence (logic 1) and absence (logic 0) of pulses to encode information. The sending of each pulse uses an amount of energy. Herein, the energy-per-pulse is denoted as E. For example, on average, OOK uses ones and zeros in equal amount, so the average energy-per-bit is 0.5E, i.e., half of the energy-per-pulse.

In accordance with embodiments of the present disclosure, binary symbols are encoded as a subset of a set of n-ary symbols, where each digit of an n-ary symbol can take one of n different values or states. In particular, a set of binary symbols may be encoded as a subset of a set of symbols containing ternary digits, where each ternary digital can take one of three values, such as +1, 0 and −1. More generally, modulation codes use a subset of available n-ary symbols. This subset may be selected to have a reduced number of non-zero digits, so that the average energy-per-bit is reduced compared to OOK.

Herein, a 'zero' signal value is taken to include a value that is small when compared to other signal values. For example, a 'zero' signal pulse is taken to mean a signal pulse that contains significantly less energy than a non-zero signal pulse.

In the sequel, N denotes the number of binary digits (bits) in a binary symbol to be transmitted and C denotes the number of n-ary (e.g. binary or ternary) digits in the corresponding modulation code. The values of N and C may be selected to achieve a desired performance level. In addition, since only a subset of the available n-ary symbols is used, the subset may be selected to achieve the desired performance level. In one embodiment, for example, a subset of n-ary symbols is selected to include only symbols that take the value zero outside of a window of length W digits, where the first digit in the window is non-zero. This modulation scheme is referred to herein as a Pulse Position Polarity Shift Keying (PPPSK) scheme and includes, as a special case, the Pulse Position Modulation (PPM) scheme in which the window length is one. Thus, in PPM, the transmitted value is indicated by the position (and optionally the level) of a single pulse within a frame. The PPPSK scheme is discussed in more detail below.

For example, for N=3, OOK requires eight, 3-cycle symbols to send all eight possible values, i.e. 24 pulses. Half of the 24 pulses are zero, so the total energy is 12E. In comparison, binary PPM uses C=8. Eight, 8-bit symbols are required to send all eight possible values. However, each 8-cycle symbol contains a single pulse, so the total energy is 8E. While the energy is reduced with binary PPM, the time to send all eight values is increased from 24 cycles to 64 cycles. Thus, there is a trade-off between energy and bit rate. This trade-off may be utilized to optimize the coding scheme for given operating requirements and constraints.

In accordance with embodiments, a ternary or tristate modulation scheme is used where a pulse can take both positive and negative values. Ternary PPM requires eight, 4-cycle symbols to send all eight possible values. Each 4-cycle symbol contains only a single pulse, so the total energy is again 8E. However, the time to send all eight values is only increased from 24 cycles to 32 cycles. In general, ternary modulation schemes can provide better performance than binary schemes.

The class of modulation schemes described herein enables selection of a scheme that achieves near optimal operation. For example, operation may be maintained above a minimum bit-rate while minimizing either power or energy or under a predetermined energy and/or power while delivering maximum throughput.

The disclosed modulation schemes provide operating points with multiple combinations of bit-rate and power or bit-rate and energy-per-bit. This enables efficient operation close to required limits.

A first example modulation scheme is referred to as PPPSK and may utilize binary, ternary or n-ary pulses.

A second example modulation scheme uses ternary (+, 0, −) pulses or n-ary pulses to achieve bit-rates higher than 1 bit-per-clock. The ternary version is also referred to herein as Tristate Polarization Keying (TPK).

PPPSK is described by several selectable parameters, which may be selected dynamically. The first selectable parameter of PPPSK is the number of bits, N, for each binary symbol, resulting is $2^N$ possible binary symbols to be communicated. Each symbol in the modulation code contains C digits. Digits outside of a window of length W are constrained to be zero. The first digit in the window is constrained to be non-zero and indicates the pulse position. The window length, W, and the code length, C, are additional selectable parameters and may be inter-related An inductor coil may be configured to issue both positive and negative (bipolar) pulses, or only monopolar pulses. Further, the pulses may be issued at different amplitudes. Modulation schemes such as PAM-n (Pulse Amplitude Modulation) make use of the n different pulse levels to encode the data. Herein, it is assumed that one of the amplitudes is zero, i.e. no pulse.

The first non-zero pulse indicates the start position of the window (in bipolar case it can be either positive or negative) within a time frame. Digits in subsequent positions within the window may take any available value. The number of different variations, F, within the window is referred to herein as the 'folding factor' and is related to the number of states or levels n by $$F=(n-1)n^{W-1}.$$

The window can appear at L different positions relative to start of a frame, so the total number of transmission symbols is L×F. In order to represent $2^N$ binary symbols, L must satisfy $$L \geq \frac{2^N}{F}.$$

The number of cycles required to send N bits, which corresponds to the number of digits in the transmitted symbol, is therefore $$C = L + W - 1.$$

It is noted that C denotes the number of clock cycles required to send a code, and therefore corresponds to a latency or delay. For serial data, a further delay of N cycles may be introduced in determining the N-bit binary symbol to be encoded.

Figure 3:
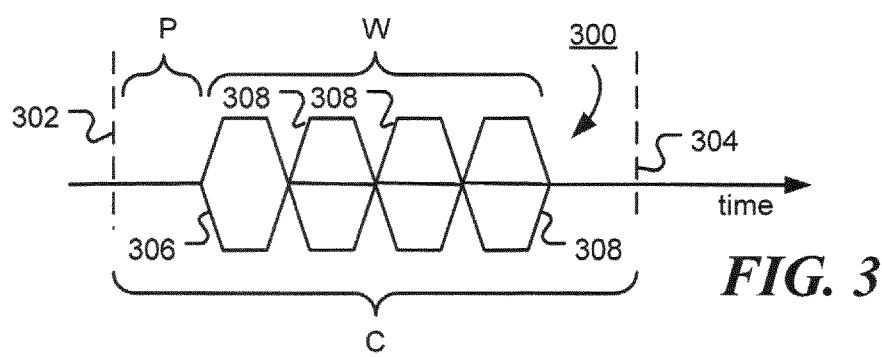
FIGS. 3 and 4 are diagrammatic representations of modulation signals, in accordance with various representative embodiments.

FIG. 3 illustrates the composition of a ternary modulation signal in accordance with a PPPSK modulation scheme. The modulation signal 300 consists of stream of pulses transmitted over C clock cycles between times 302 and 304. Outside of a time window of W clock cycles, the modulation signal is zero and requires little or no energy for transmission. The first non-zero pulse 306 occurs after P clock cycles and may be positive or negative. The pulse position and polarity may be used to decode a corresponding received signal. The following W−1 pulses 308 may be positive, negative or zero.

Figure 4:
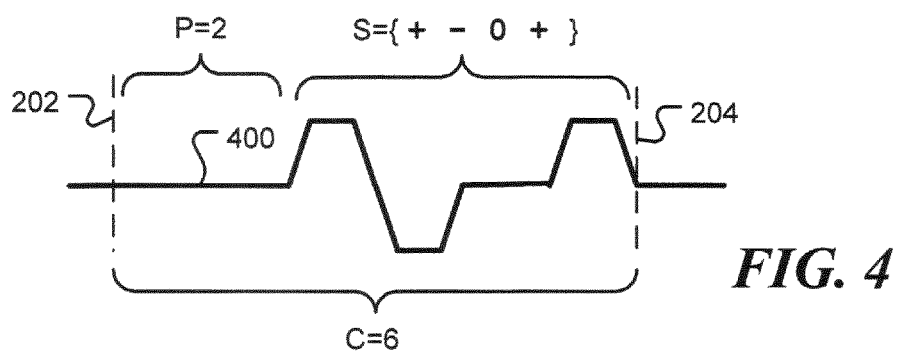

FIG. 4 shows an example PPPSK modulation signal 400. In this example, the pulse stream is transmitted over C=6 clock cycles, with the first non-zero pulse occurring in the third cycle. The window is of length W=4 cycles and represents the 4-digit ternary symbol {+ − 0 +}. Overall, the pulse stream represents the 6-digit ternary symbol {0 0 + − 0 +}.

No particular ordering of the modulation codes is assumed. Any set of modulation codes may be used, including natural counting order or gray coding (to minimize adjacent pulse misdetection bit error rates). The special case of W=1, where the window contains a single pulse, is referred to as PPM.

An example code book, in the form of a mapping table, is shown in TABLE 1. The code book shows the mapping between 4-bit binary symbols (N=4) and 4-digit ternary modulation codes (C=4) with window length W=2

TABLE 1

PPPSK with N = 4, W = 2 and C = 4.

| Binary | Ternary |
|--------|---------|
| 0000 | +000 |
| 0001 | 0+00 |
| 0010 | 00+0 |
| 0011 | −000 |
| 0100 | 0−00 |
| 0101 | 00−0 |
| 0110 | ++00 |
| 0111 | 0++0 |
| 1000 | 00++ |
| 1001 | −−00 |
| 1010 | 0−−0 |
| 1011 | 00−− |
| 1100 | +−00 |
| 1101 | 0+−0 |
| 1110 | 00+− |
| 1111 | −+00 |
| Unused | 0−+0 |
| Unused | 00−+ |

In the embodiment described above, the transmitted symbol contains at least Z=L−1 zero digits or pulses outside of the window. More generally, the transmitted symbol may contain at least Z zero digits at arbitrary locations. In the simple example shown in TABLE 1, the energy required to transmit all 16, 4-digital ternary symbols is 26E compared to 32E for OOK. The bit-rate is unchanged.

An embodiment, referred to herein as TPK, makes use of three possible states of a coil pulse, positive, negative and no-pulse, to increase the data rate for a given configuration. There are $2^N$ possible binary symbols to be transmitted and $3^C$ ternary symbols to choose from for a code of length C.

Pairs of values N, C are selected such that the maximum number of bits can be mapped to minimum of pulse bursts. TABLE 2 shows N and C values for some example TPK configurations, with achievable bit-rates per clock, N/C, and the sparsity, $3^C/2^N$. Other combinations may be used. Entries in the table are ordered in decreasing bit-rate per clock frequency. Note that, for a given bit rate per clock, having more sparsity (more ternary codes than binary symbols) enables the use of smaller number of pulses and more non-pulse options (larger values of Z), thereby lowering the overall energy for the code book.

TABLE 2 shows rates and utilizations for moderate N and C for TPK.

TABLE 2

| Bits, N | 11 | 12 | 9 | 6 | 3 | 10 | 7 | 4 |
|---|---|---|---|---|---|---|---|---|
| Ternary digits, C | 7 | 8 | 6 | 4 | 2 | 7 | 5 | 3 |
| Bit-rate, N/C | 1.57 | 1.5 | 1.5 | 1.5 | 1.5 | 1.43 | 1.4 | 1.33 |
| Sparsity, $3^C/2^N$ | 1.07 | 1.6 | 1.4 | 1.26 | 1.125 | 2.14 | 1.9 | 1.69 |

In accordance with an embodiment, the sparsity is exploited by mapping the binary symbols to the subset of available symbols that requires lower energy to transmit. For example, for N=4 and C=3, the mapping table shown in TABLE 3 may be used. In the table, the ternary value 'xxx' collectively represents the 8 symbols with no zero digits. Thus, all 16 ternary symbols used have at least one zero, and 11 of the available 27 ternary symbols are unused.

TABLE 3

N = 4, C = 3, Z = 1.

| Binary | Ternary |
|--------|---------|
| 0000 | 00+ |
| 0001 | 00− |
| 0010 | 0+0 |
| 0011 | 0−0 |
| 0100 | +00 |
| 0101 | −00 |
| 0110 | 0++ |
| 0111 | 0+− |
| 1000 | 0−+ |
| 1001 | 0−− |
| 1010 | +0+ |
| 1011 | +0− |
| 1100 | −0+ |
| 1101 | −0− |
| 1110 | ++0 |
| 1111 | +−0 |
| Unused | −+0 |
| Unused | −−0 |
| Unused | 000 |
| Unused | xxx |

The energy required to send all 16, 3-bit symbols is again 26E, but the bit-rate is increased by a factor 4/3 compared to OOK or the PPPSK example given above.

The number of symbols or codes with a given number, k, of non-zero digits in a code of length C is given by $$\binom{C}{k}(n-1)^k,$$

where n−1 is the number of non-zero digits or pulse levels and $$\binom{C}{k} = \frac{C!}{k!(C-k)!}$$

is a binomial coefficient.

For binary and ternary digits, i.e. for n≤3, the energy required to send a symbol with k non-zero elements is k×E. Some examples for n=3 are given in TABLE 4.

TABLE 4

| Number of non-zero elements | Number of Ternary Codes | | | | |
|---|---|---|---|---|---|
| k | C = 1 | C = 2 | C = 3 | C = 4 | C = 5 |
| 0 | 1 × 2⁰ = 1 | 1 × 2⁰ = 1 | 1 × 2⁰ = 1 | 1 × 2⁰ = 1 | 1 × 2⁰ = 1 |
| 1 | 1 × 2¹ = 2 | 2 × 2¹ = 4 | 3 × 2¹ = 6 | 4 × 2¹ = 8 | 5 × 2¹ = 10 |
| 2 | | 1 × 2² = 4 | 3 × 2² = 12 | 6 × 2² = 24 | 10 × 2² = 40 |
| 3 | | | 1 × 2³ = 8 | 4 × 2³ = 32 | 10 × 2³ = 80 |
| 4 | | | | 1 × 2⁴ = 16 | 5 × 2⁴ = 80 |
| 5 | | | | | 1 × 2⁵ = 32 |
| Total | 3 | 9 | 27 | 81 | 243 |

Thus, for example, with C=5, using only symbols with 1, 2 or 3 non-zero digits (at least two zeros) provides 10+40+80=130 codes, sufficient for coding binary symbols with N=7 bits. The energy required to send all $2^7$=128 binary symbols using the ternary code is 10×1+40×2+78×3=328E. This compares to 0.5×128×7=448E for OOK. The bit rate is increased by a factor N/C=7/5. Thus, compared to OOK, the energy is reduced and bit-rate is increased.

As a further example, with C=4, symbols with 1 or 2 non-zero digits (at least two zeros) can be used to provide 8+24=32 codes, sufficient for coding binary symbols with N=5 bits. These examples are highlighted in TABLE 4.

Embodiments of the present disclosure utilize the availability of multiple modulation schemes with different performance characteristics to optimize the scheme used in a given application. In particular, selection of a modulation scheme may be performed automatically during operation in response to measured system performance levels.

Figure 5:
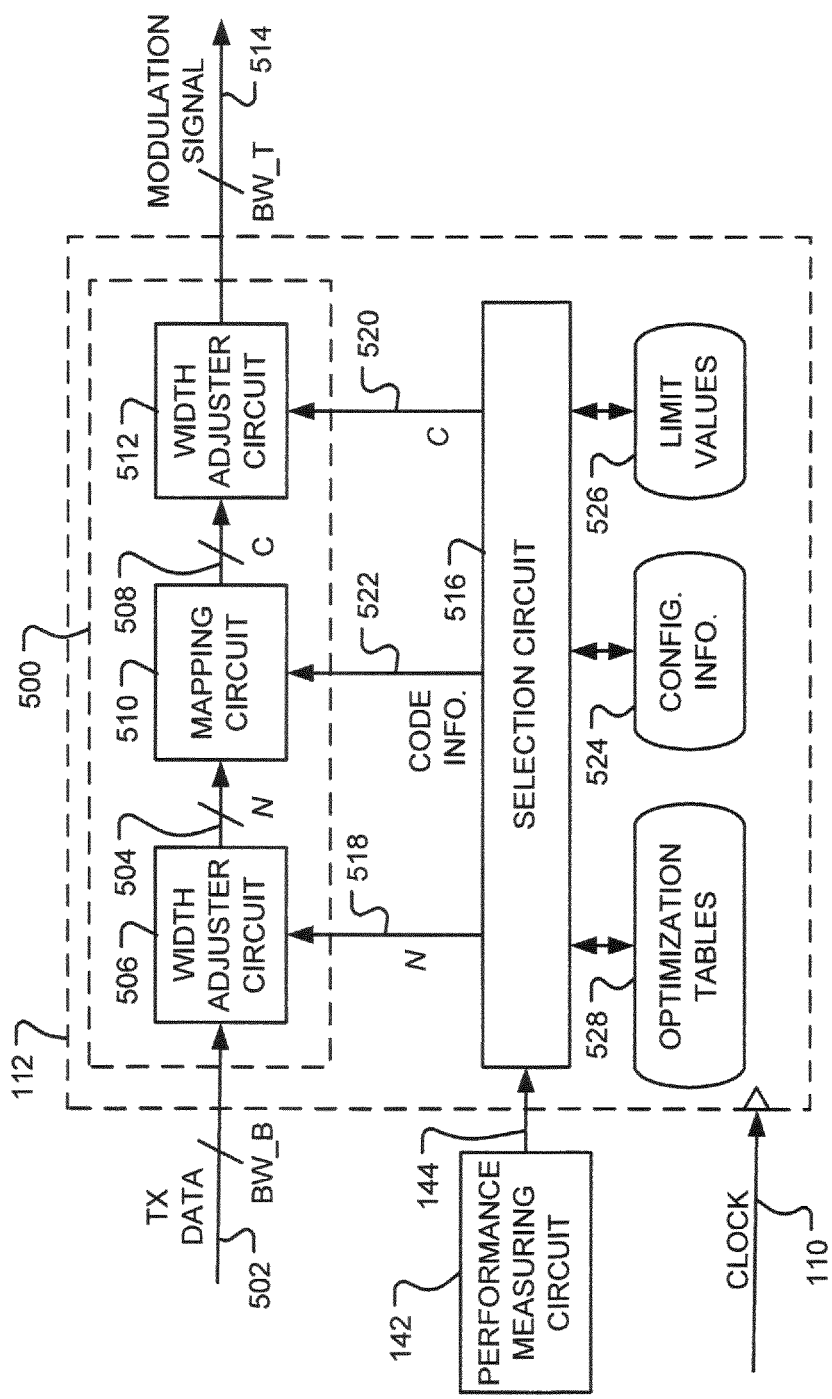
FIG. 5 is a block diagram of an adaptive modulator, in accordance with various representative embodiments.

FIG. 5 is a block diagram of adaptive modulator 112, in accordance with various representative embodiments. Adaptive modulator 112 is configured to receive data to be transmitted (TX DATA) on input 502. Input 502 may be a parallel data bus, with bus width BW_B, carrying binary data or a serial binary data stream. The data to be transmitted is converted to a binary symbol 504 of width N bits in width adjuster circuit 506. Binary symbol 504 is mapped to modulation code 508 in mapping circuit 510 in accordance with a code book. Modulation code 508 contains C digits. The modulation code is width adjusted in width adjuster circuit 512 to produce modulation signal on output bus 514 with bus width BW_T. For example, when there is a single transmission coil, BW_T=1 and the modulation signal is a serial pulse train. If there are 4 transmission coils, data may be transmitted in parallel with BW_T=4. Encoder circuit 500 comprises a combination of width adjuster circuit 506, mapping circuit 510 and width adjuster circuit 512. The configuration of encoder circuit 500 is determined by the values N and C, together with a code book that defines operation of the mapping circuit 510.

Selection circuit 516 may be used to reconfigure adaptive modulator 112. Reconfiguration may include changing the values of N (518) and C (520), and reconfiguring mapping circuit 510 in accordance with a new code book (522). A number of code books may be stored in storage element 524. Ternary codes, for example, may be stored as binary values or as ternary values in a ternary memory. Code books may alternatively be stored in a functional format.

In operation, in some embodiments, one or more performance values are measured by performance measuring circuit 142. When the measured performance value is outside of a predetermined range, the configuration of the modulator may be reset. Predetermined performance limits may be stored in storage element 526. Examples limits include: maximum energy per bit, maximum power, minimum bit-rate, and maximum latency. The configuration of the modulator may be reset with reference to a stored performance table 528. The table may contain an ordered list of configurations. When the measured performance is outside of a predetermined range, the next or previous configuration referenced in the ordered list is selected, as appropriate. The list may be ordered with respect to power, energy, bit-rate, or other performance value.

In some embodiments, adaptive modulator 112 may be configured in manufacture to perform the designated functions. In other embodiments it may be provided with the required structure to enable it to be reconfigured or adapted to perform those functions before or during operation.

Figure 6:
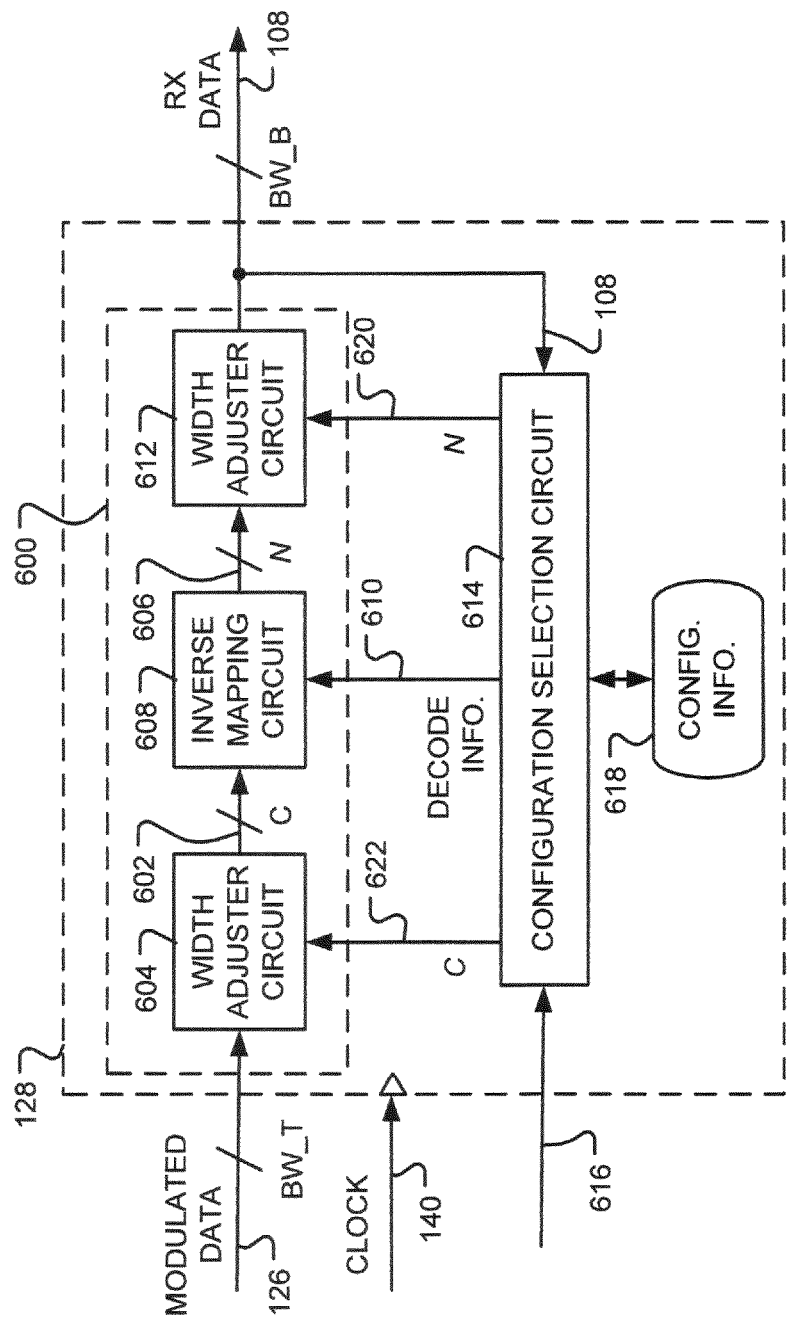
FIG. 6 is a block diagram of a demodulator, in accordance with various representative embodiments.

FIG. 6 is a block diagram of a demodulator 128, in accordance with various representative embodiments. Demodulator 128 is configured to receive modulated data on input 126. Input 126 may be a parallel data bus with width BW_T carrying data from multiple receiving coils, or a serial bus with BW_T=1. The modulated data is converted into modulation codes 602 with width C digits in width adjuster circuit 604. Modulation codes 602 are mapped to N-bit binary symbols 606 in inverse mapping circuit 608 in accordance with decode information 610. The binary symbols are width adjusted in width adjuster circuit 612 to produce the RX data 108 with width BW_B. Decoder 600 comprises the combination of width adjuster circuit 604, inverse mapping circuit 608 and width adjuster circuit 612. The configuration of decoder 600 is determined by the values N and C, together with a code book or function that defines operation of inverse mapping circuit 608. The decoder is configured by configuration selection circuit 614. The configuration may be indicated, for example, by information in RX data 108, by information in clock signal 140 or via a separate channel 616. Configuration information is retrieved from data store 618 and passed to decoder 600 as binary symbol width 620 (N), modulation code width 622 (C) and decode information 610 (code book or function).

Figure 7A:
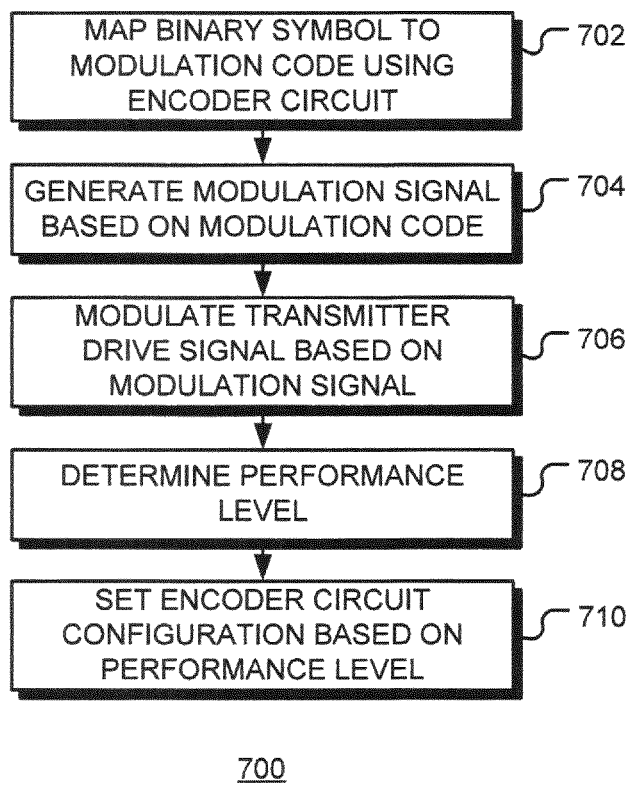
FIGS. 7A and 7B are flow charts of a method of operation of an adaptive modulator, in accordance with various representative embodiments.

FIG. 7A is a flow chart 700 of a method of transferring data using an adaptive modulator, in accordance with various representative embodiments. At block 702 a binary symbol of the data is mapped to a modulation code having two or more modulation digits, using an encoder circuit having a configuration. At block 704, a modulation signal is generates based on the modulation code and, at block 706, a transmitter drive signal is modulated based on the modulation signal. A performance level is determined at block 708 and the configuration of the encoder circuit is set, based on the performance level, at block 710.

Figure 7B:
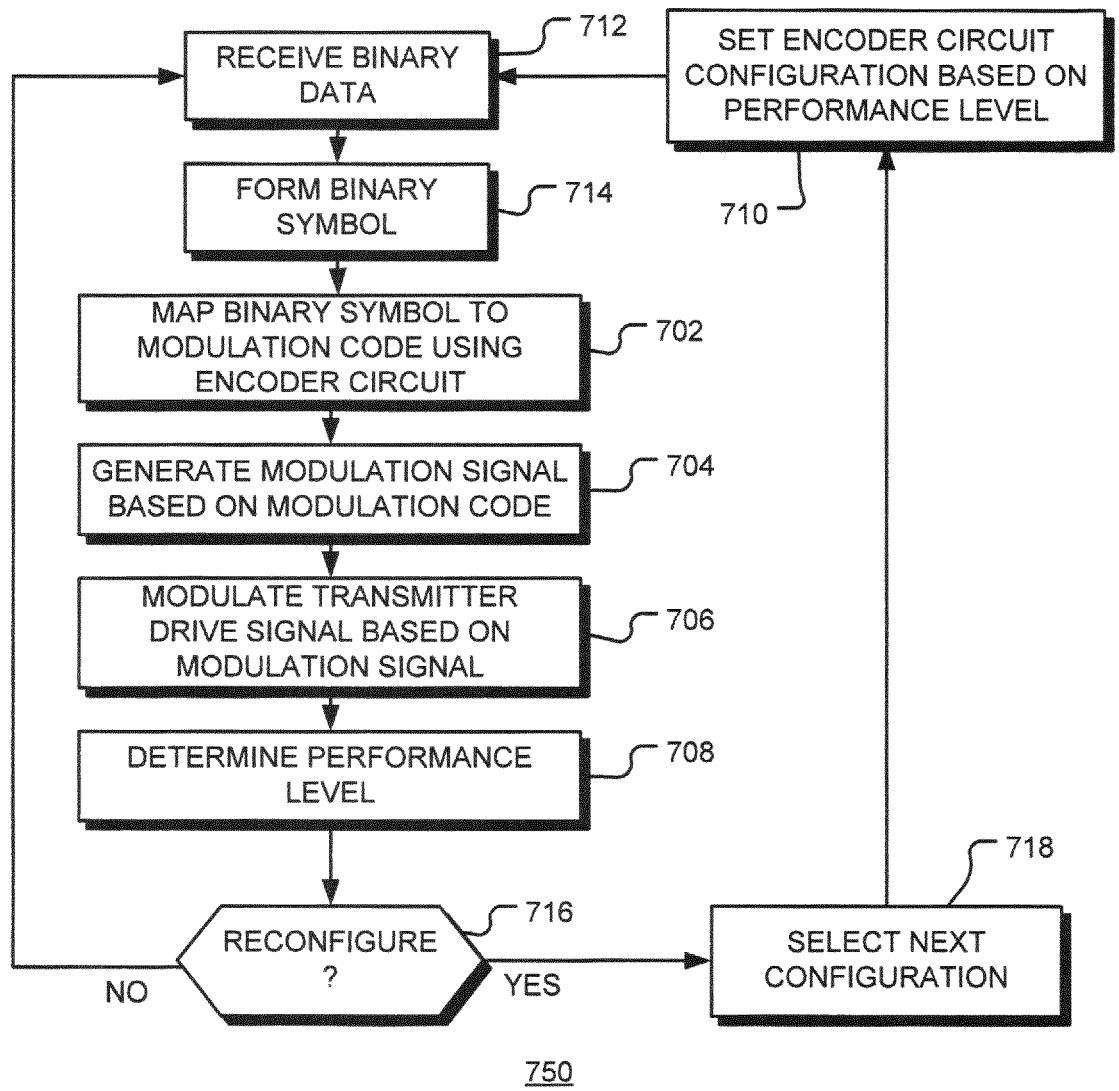

FIG. 7B is a further flow chart 750 of a method of transferring data using an adaptive modulator, in accordance with various representative embodiments. Binary data to be transmitted is received at block 712. An N-bit binary symbol is formed from data at block 714. The N-bit binary symbol is mapped to an n-ary modulation code at block 702. Each digit of the modulation code can take one of n possible states. One or more modulation signals are produced based on the modulation code at block 704. For example, the modulation signal may be a single pulse train when there is only a single induction coil. The one or more modulation signals are used to modulate a drive to the one or more induction coils at block 706. A performance level, such as power or energy consumption, is measured at block 708. If the measured performance value is outside of a predetermined range, it may be desirable to reconfigure the encoder circuit of the modulator, as depicted by the positive branch from decision block 716. The next configuration is selected at block 718—from a performance table for example—and the configuration of encoder circuit is reset at block 710 and flow returns to block 712 to await the receipt of more binary data.

Figure 8:
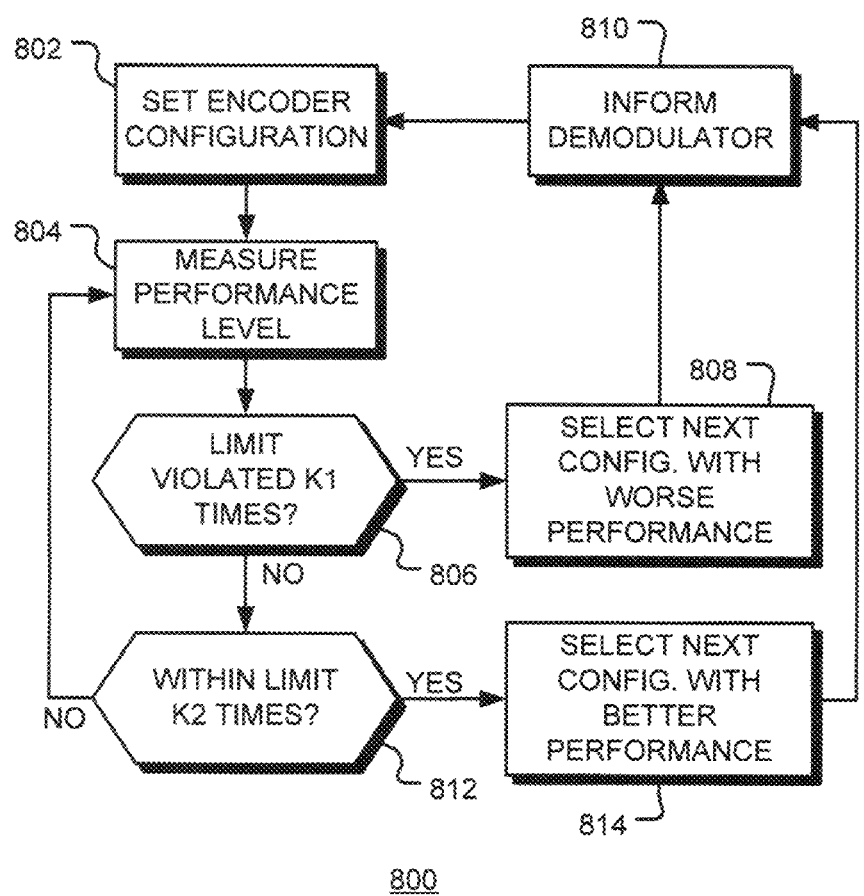
FIG. 8 is a further flow chart of a method of operation of an adaptive modulator, in accordance with various representative embodiments.

FIG. 8 is a flow chart 800 of a method of operation of an adaptive modulator, in accordance with various representative embodiments. Flow chart 800 shows more details of an example method of adaptation. Following block 802, the transmitter configures the encoder at block 804. Initially, this may be a default configuration. At block 806, one or more performance values are measured. A performance value may be, for example, an average value, a peak value or a minimum value over some time period. The performance may be, for example, a measure of energy, power or bit-rate. If optimization is to be stopped, as depicted by the positive branch from decision block 808, the method terminates at block 810. Otherwise, as depicted by the negative branch from decision block 808, flow continues to decision block 812. If a predetermined limit for the measured value has been exceeded, as depicted by the positive branch from decision block 812, the next modulation configuration with worse performance is selected at block 814. This is done using a performance table. In the example shown, the limit must be exceeded k1 times before reconfiguration. The receiver is informed of the modulation configuration to be used at block 816 and the encoder is reconfigured with the selected configuration at block 804.

If the predetermined limit for the measured value has not been exceeded, as depicted by the negative branch from decision block 812, flow continues to decision block 818.

If the measured performance has not exceeded a predetermined limit, as depicted by the positive branch from decision block 818, it may be possible to improve performance and a modulation configuration with the next configuration with better performance is selected at block 820. In the example shown, the performance value must be below the predetermined limit k2 times before reconfiguration.

The parameters k1 and k2 may be set according to the particular embodiment and maybe programmable. The onset of a change to the modulation scheme may be signaled in the data. For example, when data is sent as packets, consecutive packets may contains a countdown timer, in which case a number of packets will be required to move to a new modulation scheme.

It is noted that other optimization, such as maximum rate at any power/energy or lowest power/energy for an acceptable delay, is possible by selecting configurations corresponding to extreme points in FIGS. 9-12 discussed below, or additional points.

It will be apparent to those skilled in the art that other approaches may be used to select between the available configurations without departing from the present disclosure.

Figure 9:
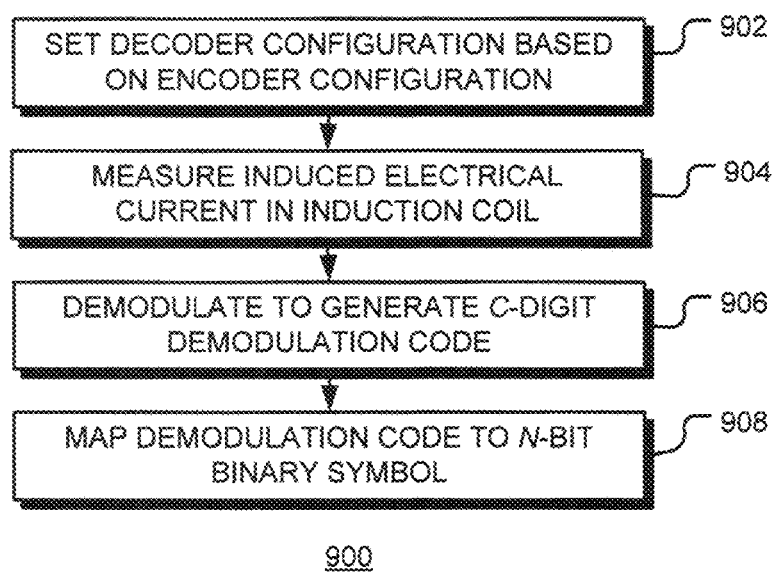
FIG. 9 is a flow chart of a method of operation of a demodulator in accordance with various representative embodiments.

FIG. 9 is a flow chart 900 of a method of operation of a demodulator in accordance with various representative embodiments. At block 902, the configuration of the decoder is set based on the configuration of the corresponding encoder. At block 904, the current induced in the inductor coil is measured, and at block 906 the induced current is demodulated to generate a C-digit demodulation code. At block 908, the C-digit demodulation code is mapped to an N-bit binary symbol. In this manner, the transmitted binary symbol is recovered.

Figure 10:
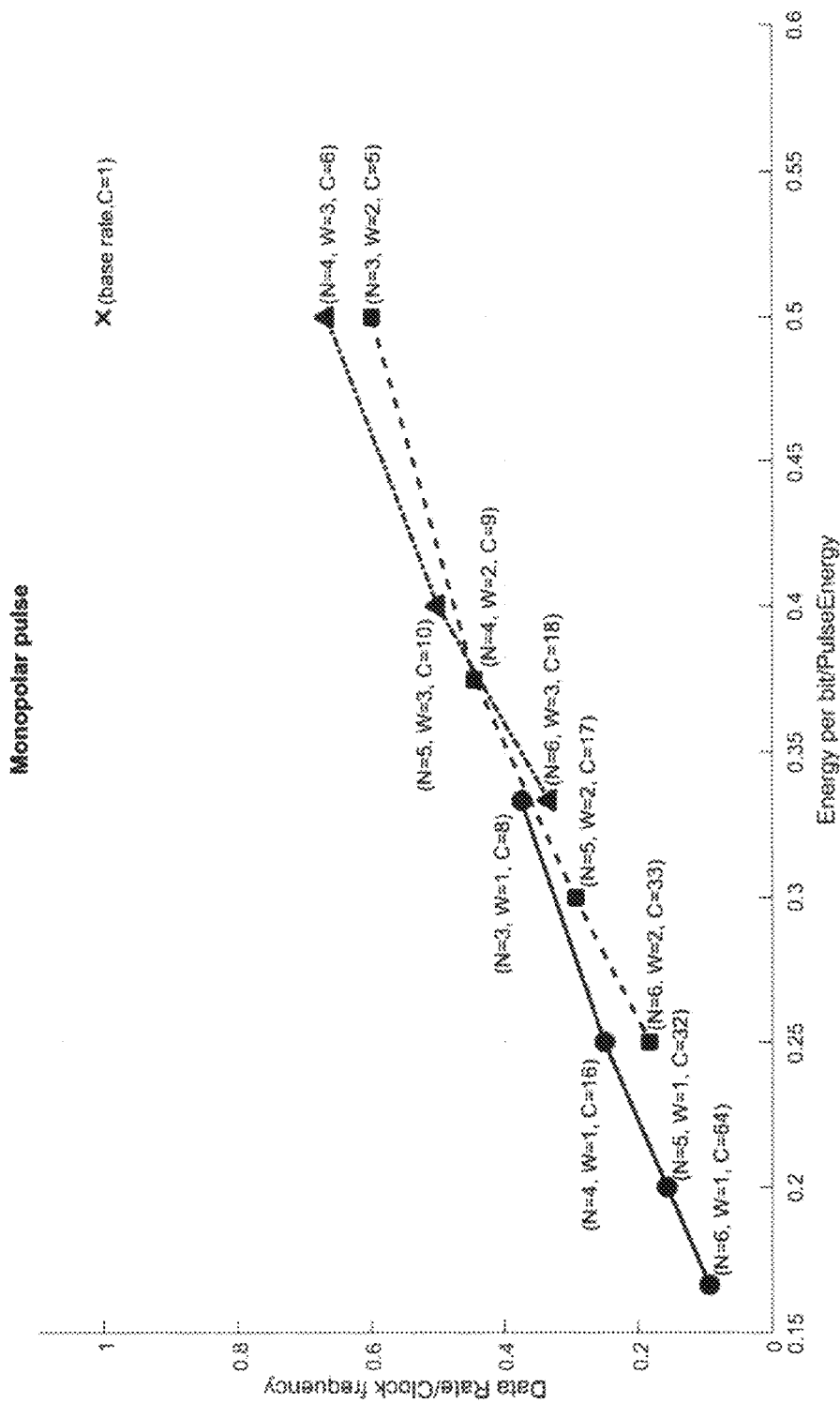
FIGS. 10 to 13 are graphs showing selectable operating points for a wireless communication system, in accordance with various representative embodiments.
Figure 11:
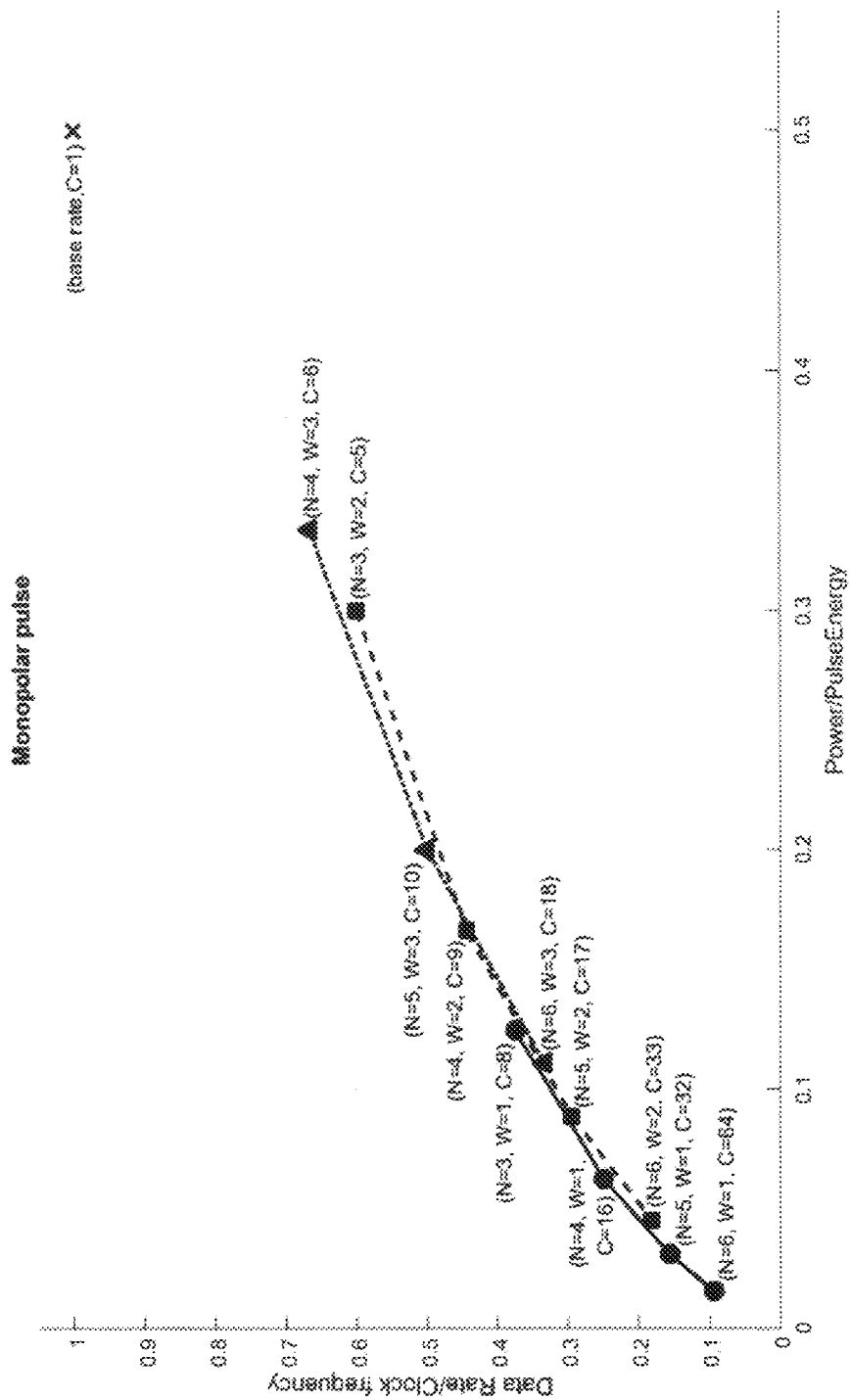
Figure 12:
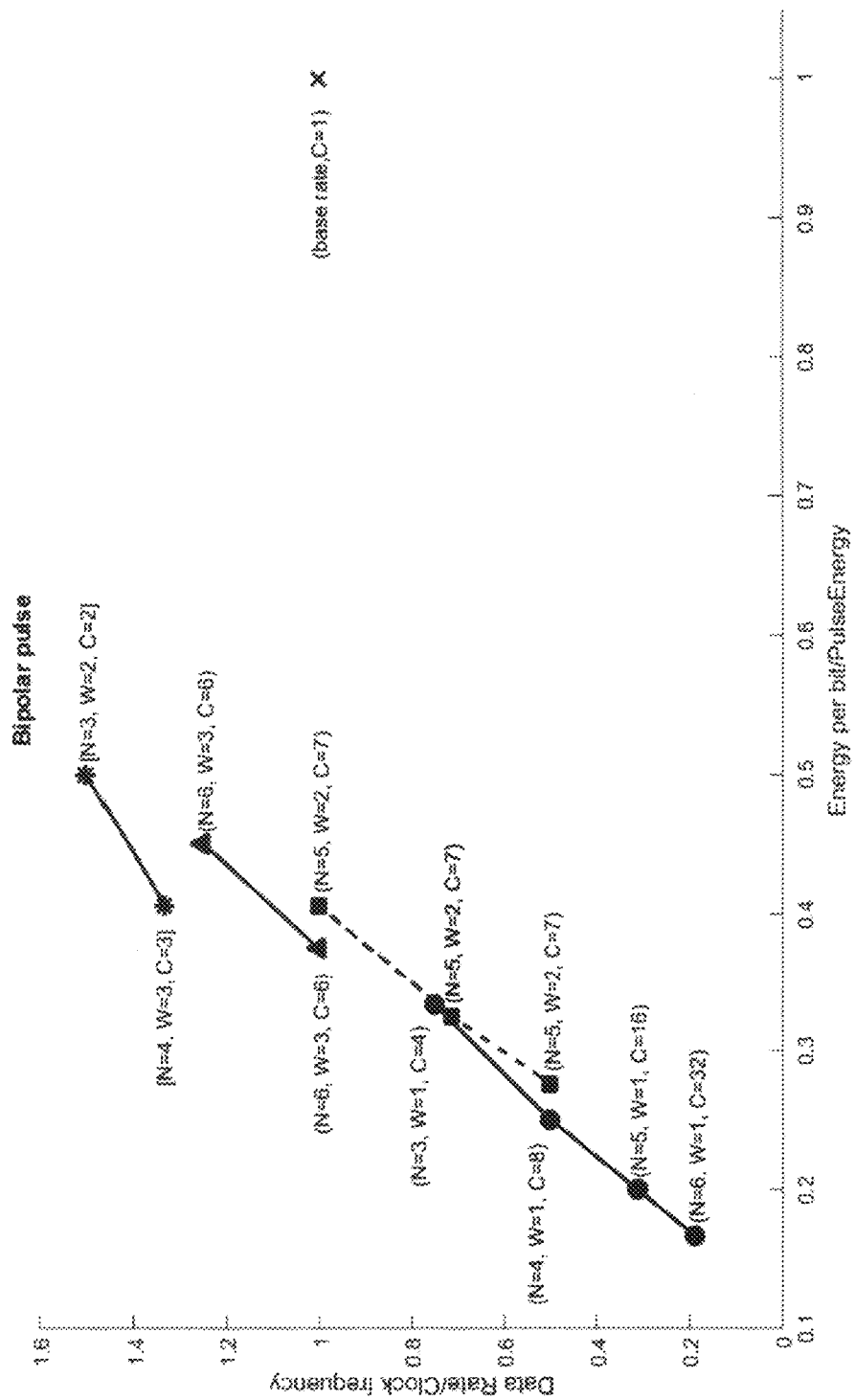
Figure 13:
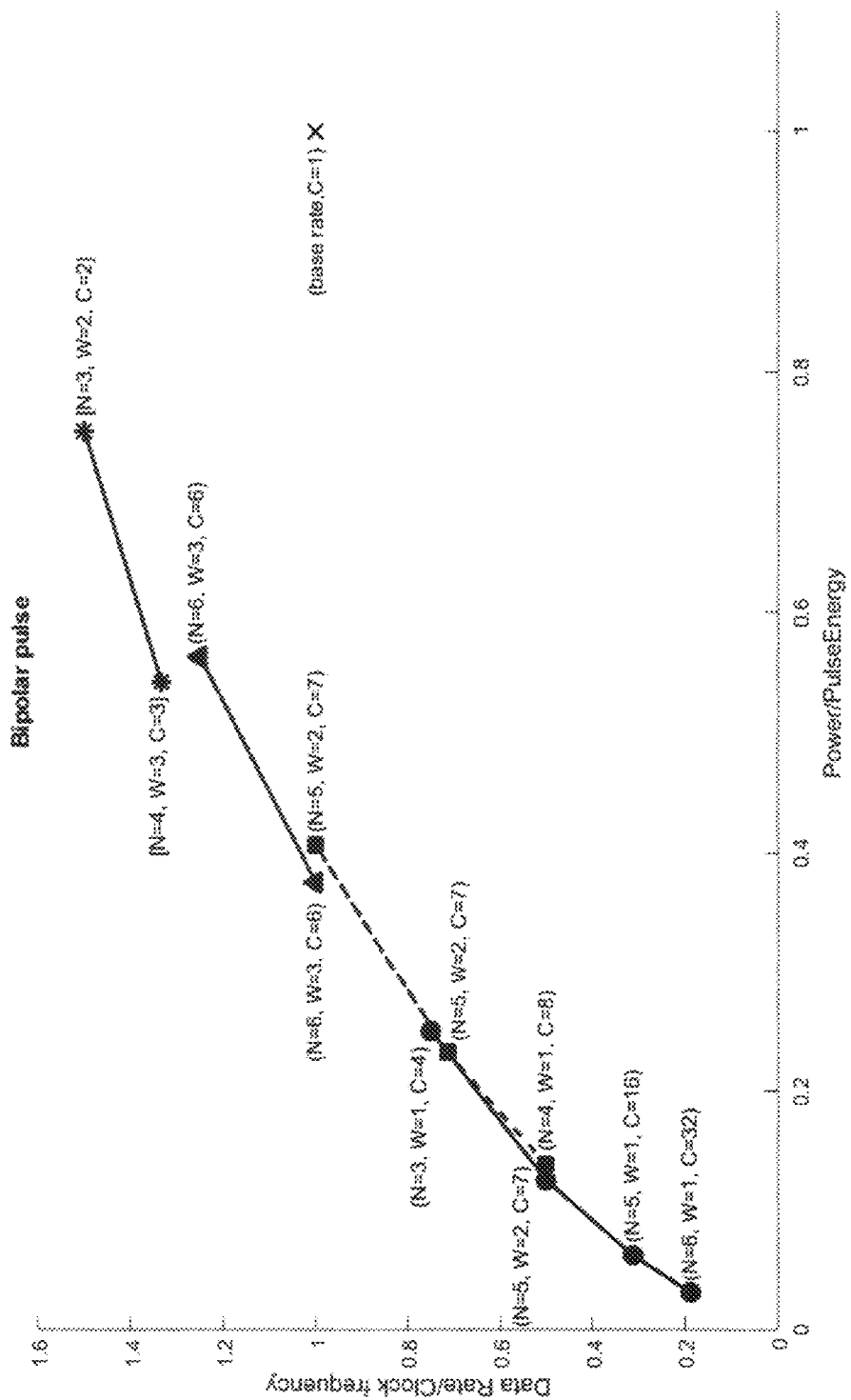

Example sets of modulation points are shown in FIG. 10 to FIG. 13. The bit-rate per clock frequency versus power per pulse energy for monopolar pulses is shown in FIG. 10. The bit rate per clock frequency versus energy per bit per pulse energy is shown in FIG. 11. Similar plots for bipolar pulses are shown in FIG. 12 and FIG. 13, respectively. In these figures, the value C is the minimum (but fixed) delay in sending the symbol.

For each modulation point, if there is a modulation point in the north west quadrant, including directly vertical and horizontal, that modulation point is excluded if the relevant condition is in operation (for clarity, none of these is shown here).

It is also noted that the points for W=1 correspond to the special case of PPM.

To illustrate the usefulness of these schemes, an example is considered where the system only needs to operate at an overall rate of at least 0.5 bits per clock with minimum power per pulse. Referring to FIG. 11, if simple OOK was used the system would operate at the base rate, resulting in an average power consumption of 0.5E (where E is the pulse energy). However, when PPPSK is available, the N=5, W=3 operating point may be selected, giving average power consumption of 0.2E. Thus, a saving of 60% is achieved compared to OOK.

The modulation scheme to be used may be selected dynamically in operation to achieve a desired performance goal. Example performance goals include: achieve the best bit rate while remaining below a maximum energy, achieve the best bit rate while remaining below a maximum power, achieve the best energy utilization while remaining above a minimum bit-rate, and achieve the best power utilization while remaining above a minimum bit-rate.

Dynamic selection may be achieved using a lookup table (in both transmitter and receiver) of adjacent modulation schemes. The table may be an ordered list of bit-rate versus energy, or bit-rate versus power, for available modulation schemes.

TABLE 5 shows an example performance table for that lists configurations ordered in terms of power (for goals 2 and 4 above) with monopolar pulsing case.

TABLE 5

| Scheme | Bits N | Window W | Clocks C |
|---|---|---|---|
| PPPSK | 4 | 3 | 6 |
| PPPSK | 3 | 2 | 5 |
| PPPSK | 5 | 3 | 10 |

TABLE 5-continued

| Scheme | Bits N | Window W | Clocks C |
|---|---|---|---|
| PPPSK | 4 | 2 | 9 |
| PPPSK | 3 | 1 | 8 |
| PPPSK | 6 | 3 | 18 |
| PPPSK | 5 | 2 | 17 |
| PPPSK | 4 | 1 | 16 |
| PPPSK | 6 | 2 | 33 |
| PPPSK | 5 | 1 | 32 |
| PPPSK | 6 | 1 | 64 |

TABLE 6 shows an example performance lookup table listing configurations in order of power (for goals 2 and 4 above) using bipolar (ternary) pulsing.

TABLE 6

| Scheme | Bits N | Window W | Clocks C |
|---|---|---|---|
| TPK | 3 | — | 2 |
| TPK | 4 | — | 3 |
| PPPSK | 6 | 3 | 6 |
| PPPSK | 3 | 1 | 4 |
| PPPSK | 5 | 2 | 7 |
| PPPSK | 4 | 1 | 8 |
| PPPSK | 5 | 1 | 16 |
| PPPSK | 6 | 1 | 32 |

TABLE 7 shows an example performance table ordered with respect to energy (for goals 1 and 3 above) using monopolar pulsing.

TABLE 7

| Scheme | Bits N | Window W | Clocks C |
|---|---|---|---|
| PPPSK | 5 | 3 | 10 |
| PPPSK | 4 | 2 | 9 |
| PPPSK | 3 | 1 | 8 |
| PPPSK | 5 | 2 | 17 |
| PPPSK | 4 | 1 | 16 |
| PPPSK | 6 | 2 | 33 |
| PPPSK | 5 | 1 | 32 |
| PPPSK | 6 | 1 | 64 |

TABLE 8 shows an example performance table ordered with respect to energy (for goals 1 and 3 above) using bipolar (ternary) pulsing.

TABLE 8

| Scheme | Bits N | Window W | Clocks C |
|---|---|---|---|
| TPK | 3 | — | 2 |
| TPK | 4 | — | 3 |
| PPPSK | 6 | 3 | 6 |
| PPPSK | 3 | 1 | 4 |
| PPPSK | 5 | 2 | 7 |
| PPPSK | 4 | 1 | 8 |
| PPPSK | 5 | 1 | 16 |
| PPPSK | 6 | 1 | 32 |

Each entry in a performance table provides a specification of a configuration, a reference to the configuration, or a combination thereof. For example, a table entry may list the number of digits (N) in the binary symbols, together with the number of clock cycles (C) required, a window width (W), and an address of a stored code book. The code book may in a functional form or in the form of a lookup table. Alternatively, the table entry may only contain a reference to stored configuration data.

The disclosed modulation scheme enables wirelessly-coupled chips, and other wireless communication systems, to operate at a near-optimal point of power/energy and required bit-rate.

In addition to optimizing the modulation scheme, the Pulse Energy of the coil can be adjusted or the pulse characteristics shaped within allocated limits to achieve better signal-to-noise ratio (SNR). Also, it is possible to choose a scheme that optimizes the latency of the communication when that is an over-riding requirement of the coil system.

In one embodiment, PPPSK coding and/or decoding is implemented using arithmetic computations rather than look-up tables. For example, a decimal value n may be encoded as a window of W ternary digits $\{T_1, T_2, T_3, \ldots, T_W\}$ at position P in a frame, where $T_w=0$ indicates no pulse, 1 indicates a positive pulse, and 2 indicates a negative pulse). $T_1$ is the leading pulse.

In an example encoding, the position P is computed as P=mod(n, L), where L is the number of available positions for a window. The ternary digits are computed as $$T_1 - 1 = \text{floor}\left(\frac{\text{mod}(n, 2L)}{L}\right),$$

$$T_w = \text{floor}\left(\frac{\text{mod}(n, 2L*3^{w-1})}{2L*3^{w-2}}\right), w \neq 1.$$

The decimal value n is decoded according to $$n = L\left[2\sum_{w=2}^{W} T_w * 3^{w-2} + T_1 - 1\right] + P.$$

An example with N=4, W=2 and C=4 is shown in TABLE 9. The number of available pulse positions is L=C−W+1=3.

TABLE 9

Example Ternary Encoder/Decoder table for N = 4, W = 2, C = 4, L = 3

| Ternary Code | Position, P | $T_1$ | $T_2$ | N |
|---|---|---|---|---|
| +000 | 0 | 1 | 0 | 0 |
| 0+00 | 1 | 1 | 0 | 1 |
| 00+0 | 2 | 1 | 0 | 2 |
| −000 | 0 | 2 | 0 | 3 |
| 0−00 | 1 | 2 | 0 | 4 |
| 00−0 | 2 | 2 | 0 | 5 |
| ++00 | 0 | 1 | 1 | 6 |
| 0++0 | 1 | 1 | 1 | 7 |
| 00++ | 2 | 1 | 1 | 8 |
| −+00 | 0 | 2 | 1 | 9 |
| 0−+0 | 1 | 2 | 1 | 10 |
| 00−+ | 2 | 2 | 1 | 11 |
| +−00 | 0 | 1 | 2 | 12 |
| 0+−0 | 1 | 1 | 2 | 13 |
| 00+− | 2 | 1 | 2 | 14 |
| −−00 | 0 | 2 | 2 | 15 |
| 0−−0 | 1 | 2 | 2 | — |
| 00−− | 2 | 2 | 2 | — |

The unused codes may be used for signaling, e.g. for packet synchronization. The first and last columns of TABLE 9 can be stored as a table for encoding and decoding. Alternatively, using the formulae presented above, the decimal value n may be encoded functionally using:

$$T_1 = \text{floor}\left(\frac{\text{mod}(n, 6)}{3}\right) + 1,$$

$$T_2 = \text{floor}\left(\frac{n}{6}\right).$$

The transmitted symbol is decoded as $n = 3[2T_2 + T_1 - 1] + P.$

Functional descriptions for other encoding/decoding schemes will be apparent to those of ordinary skill in the art.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by computer-readable code. The code may be instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

Further, dedicated or reconfigurable hardware components used to implement the disclosed mechanisms may be described by a mask set comprising computer-readable code defining geometry for photolithographic steps of semiconductor fabrication.

The computer-readable, whether HDL instructions, netlist, mask set or other, may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for transferring data, the method comprising:
    mapping the data to a modulation code, using an encoder circuit having a configuration, including:
        mapping a binary symbol of the data to a modulation code having a plurality of modulation digits;
        generating a modulation signal based on the modulation code;
        modulating a transmitter drive signal based on the modulation signal;
        determining a performance level; and
        setting the configuration of the encoder circuit based on the performance level,
    where said setting the configuration of the encoder circuit based on the performance level includes:
        setting a width, in bits, of the binary symbol;
        setting a width, in digits, of the modulation code; or
        a combination thereof.

2. The method of claim 1, where the modulation code includes:
one or more modulation digits inside a window, a leading digit of the one or more modulation digits inside the window having a non-zero value; and
one or more modulation digits outside of the window, the one or more modulation digits outside of the window having a value of zero.

3. The method of claim 1, where the modulation code is selected from a set of binary modulation codes in which each modulation code includes at least two modulation digits having a value of zero.

4. The method of claim 1, where the modulation code is selected from a set of ternary modulation codes in which each modulation code includes at least one modulation digit having a value of zero.

5. The method of claim 1, where digits of the plurality of modulation digits are ternary digits, and where the modulation signal has a positive level, a negative level or a zero level.

6. The method of claim 1, where digits of the plurality of modulation digits are binary digits, and where the modulation signal has a zero level or a non-zero level.

7. The method of claim 1, where said modulating the transmitter drive signal includes modulating an electrical current in a transmitting inductor to produce an electromagnetic field.

8. The method of claim 7, further comprising:
setting a configuration of a decoder circuit based on the configuration of the encoder circuit;
measuring an electrical current induced in a receiving inductor to generate a received signal, the receiving inductor being located in an electromagnetic near-field of the transmitting inductor;
demodulating the received signal to produce a plurality of demodulated digits; and
mapping, in the decoder circuit, the plurality of demodulated digits to a received binary symbol.

9. The method of claim 1, where said setting the configuration of the encoder circuit based on the performance level includes selecting the configuration from a predetermined set of configurations.

10. The method of claim 1, where the performance level is a power level, an energy level, an effective data transfer rate, an error rate or a transfer latency.

11. The method of claim 1, where said generating the modulation signal includes converting the modulation code to a pulse stream, the method further comprising:
indicating one or more boundaries of the pulse stream using a synchronization signal and a clock signal.

12. The method of claim 1, where the encoder circuit includes a look-up table.

13. The method of claim 1, where said setting the configuration of the encoder circuit includes:
when the performance level is above a predetermined upper level:
determining a new configuration for the encoder circuit, based on the performance level, that reduces the performance level; and
setting the configuration of the encoder circuit to the new configuration; and
when the performance level is below a predetermined lower level:
determining a new configuration for the encoder circuit, based on the performance level, that increases the performance level; and
setting the configuration of the encoder circuit to the new configuration.

14. An apparatus comprising:
a first semiconductor die, including:
a modulator configured to generate a modulation signal having three levels, the modulation signal being based on a modulation code, the modulator including an encoder having a configuration to generate the modulation code from a binary symbol of data to be transmitted from the first semiconductor die;
a first induction coil; and
a drive module, coupled to the modulator and the first induction coil, configured to generate a positive, negative or zero electrical current in the first induction coil based on the level of the modulation signal; and
a second semiconductor die, including:
a second induction coil;
a demodulator; and
an amplifier, coupled to the second induction coil and the demodulator, configured to amplify a signal induced in the second induction coil to generate an amplified signal and to provide the amplified signal to the demodulator when the second induction coil is located in a near-field of an electromagnetic field produced by the electrical current in the first induction coil.

15. The apparatus of claim 14, where the second semiconductor die is packaged with the first semiconductor die.

16. The apparatus of claim 14, where:
the first semiconductor die further includes an additional drive module driven by a clock signal, and a third induction coil coupled to the additional drive module,
the second semiconductor die further includes an additional amplifier coupled to the demodulator, and a fourth induction coil coupled to the additional amplifier, and
where an electrical current is induced in the fourth induction coil when the fourth induction coil is located in a near-field of an electromagnetic field produced by an electrical current in the third induction coil.

17. The apparatus of claim 14, where:
the first semiconductor die further includes a performance measuring module, coupled to the modulator, configured to produce a performance level; and
the modulator further includes a selection circuit configured to reset the configuration of the encoder when the performance level is outside of a predetermined range.

18. The apparatus of claim 17, where the first semiconductor die further includes storage for a performance table indicating an ordered list of encoder configurations.

19. The apparatus of claim 17, where the first semiconductor die further includes storage for a plurality of code books providing different performance levels, and where the configuration of the encoder is reset, by the selection circuit, based on upon a code book selected from the plurality of code books.

20. The apparatus of claim 14, where the encoder further includes;
a first width adjuster configured to generate the binary symbol based on the data to be transmitted;
a second width adjuster configured to receive the modulation code; and
a mapping circuit based on a code book, where the configuration of the encoder includes a width, in bits, of the binary symbol, a width, in digits, of the modulation code and the code book.

* * * * *